US009128357B2

(12) United States Patent
Chung et al.

(10) Patent No.: US 9,128,357 B2
(45) Date of Patent: Sep. 8, 2015

(54) VEHICULAR PROJECTION SYSTEM PROJECTING ON MULTIPLE SCREENS

(75) Inventors: Po-Jen Chung, Hsinchu (TW); Wei-Szu Lin, Hsinchu (TW); Chih-Hsien Tsai, Hsinchu (TW); Kang-Hsi Li, Hsinchu (TW); Hung-Chih Chou, Hsinchu (TW); Chien-Jung Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 401 days.

(21) Appl. No.: 13/548,164

(22) Filed: Jul. 12, 2012

(65) Prior Publication Data

US 2013/0100527 A1 Apr. 25, 2013

(30) Foreign Application Priority Data

Oct. 19, 2011 (TW) .............................. 100137885 A

(51) Int. Cl.
*G03B 21/00* (2006.01)
*G03B 21/14* (2006.01)
*G02B 5/30* (2006.01)
*G03B 21/10* (2006.01)
(Continued)

(52) U.S. Cl.
CPC *G03B 21/14* (2013.01); *G02B 5/30* (2013.01); *G02B 27/0101* (2013.01); *G03B 21/10* (2013.01); *G03B 21/28* (2013.01); *H04N 9/3147* (2013.01); *B60K 2350/1068* (2013.01); *B60K 2350/20* (2013.01); *B60K 2350/2052* (2013.01); *B60K 2350/2056* (2013.01); *G01C 21/365* (2013.01); *G02B 27/22* (2013.01); *G02B 27/26* (2013.01)

(58) Field of Classification Search
CPC ............. H04N 9/3147; B60K 2350/20; B60K 2350/2052; B60K 2350/2056; B60K 2350/1068; G02B 27/22; G02B 27/26; G01C 21/365
USPC .......................................... 353/11, 12, 13, 14
See application file for complete search history.

(56) References Cited

U.S. PATENT DOCUMENTS 4,480,893 A * 11/1984 Fantone ........................ 359/465
5,548,348 A * 8/1996 Kawabata et al. ............ 348/766
(Continued)

FOREIGN PATENT DOCUMENTS

JP 11-088804 3/1999
JP 2000171896 A * 6/2000 ............. G03B 21/00
(Continued)

OTHER PUBLICATIONS

"Office Action of Taiwan Counterpart Application", issued on Jul. 2, 2014, p. 1-p. 8, in which the listed reference was cited.
(Continued)

*Primary Examiner* — Bao-Luan Le
(74) *Attorney, Agent, or Firm* — Jianq Chyun IP Office

(57) ABSTRACT

A vehicular projection system including a projection apparatus, a beam splitting module, and two projection screens is provided. The projection apparatus provides at least one image light beam. The beam splitting module divides the image light beam into a first image light beam and a second image light beam. The two projection screens receive the first image light beam and the second image light beam respectively. Each of the first image light beam and the second image light beam respectively forms an image on one of the two projection screens corresponding thereto.

10 Claims, 3 Drawing Sheets

(51) Int. Cl.
*G03B 21/28* (2006.01)
*H04N 9/31* (2006.01)
*G02B 27/01* (2006.01)
*G02B 27/22* (2006.01)
*G01C 21/36* (2006.01)
*G02B 27/26* (2006.01)

(56) References Cited

U.S. PATENT DOCUMENTS

| | | | |
|---|---|---|---|
| 5,612,741 A * | 3/1997 | Loban et al. | 348/383 |
| 6,424,437 B1 * | 7/2002 | Popovich | 359/15 |
| 7,131,728 B2 * | 11/2006 | Nambudiri et al. | 353/13 |
| 7,629,877 B2 * | 12/2009 | Lvovskiy et al. | 340/438 |
| 7,777,960 B2 | 8/2010 | Freeman | |
| 8,142,030 B2 * | 3/2012 | Bowden et al. | 353/82 |
| 8,243,287 B2 * | 8/2012 | Nishigaki et al. | 356/614 |
| 8,277,055 B2 * | 10/2012 | Kuhlman et al. | 353/98 |
| 8,305,678 B2 * | 11/2012 | Kuhlman et al. | 359/298 |
| 8,363,325 B2 * | 1/2013 | Kuhlman et al. | 359/639 |
| 8,425,041 B2 * | 4/2013 | Schuck et al. | 353/7 |
| 8,602,563 B2 * | 12/2013 | Nishikawa et al. | 353/30 |
| 8,721,083 B2 * | 5/2014 | Huang | 353/7 |
| 2005/0057442 A1 * | 3/2005 | Way | 345/9 |
| 2005/0259223 A1 * | 11/2005 | Hopman | 353/13 |
| 2007/0008503 A1 * | 1/2007 | Choi | 353/98 |
| 2009/0128780 A1 * | 5/2009 | Schuck et al. | 353/20 |
| 2009/0268163 A1 * | 10/2009 | Bowden et al. | 353/13 |
| 2010/0141856 A1 * | 6/2010 | Schuck et al. | 349/9 |
| 2010/0182571 A1 * | 7/2010 | Nishikawa et al. | 353/20 |
| 2011/0122049 A1 * | 5/2011 | Lvovskiy et al. | 345/1.3 |
| 2011/0175798 A1 * | 7/2011 | Sato et al. | 345/7 |
| 2012/0019781 A1 * | 1/2012 | Kuhlman et al. | 353/13 |
| 2012/0057134 A1 * | 3/2012 | Huang | 353/8 |
| 2012/0062999 A1 * | 3/2012 | Kuhlman et al. | 359/639 |
| 2012/0170108 A1 * | 7/2012 | Kuhlman et al. | 359/298 |
| 2013/0107218 A1 * | 5/2013 | Ebbesmeier et al. | 353/8 |

FOREIGN PATENT DOCUMENTS

| | | |
|---|---|---|
| JP | 2002104024 | 4/2002 |
| JP | 2004126465 | 4/2004 |
| JP | 2006011237 | 1/2006 |
| JP | 2010164941 | 7/2010 |
| JP | 2011013455 | 1/2011 |
| TW | 201009473 | 3/2010 |
| TW | I328139 | 8/2010 |
| WO | 2009119808 | 10/2009 |

OTHER PUBLICATIONS

"Office Action of Japan Counterpart Application", issued on Aug. 27, 2013, p. 1-p. 3, in which the listed references were cited.

* cited by examiner

VEHICULAR PROJECTION SYSTEM PROJECTING ON MULTIPLE SCREENS

CROSS-REFERENCE TO RELATED APPLICATION

This application claims the priority benefit of Taiwan application serial no. 100137885, filed on Oct. 19, 2011. The entirety of the above-mentioned patent application is hereby incorporated by reference herein and made a part of this specification.

BACKGROUND

1. Field of the Invention

The invention relates to a projection system, and more particularly to a vehicular projection system.

2. Description of Related Art

With the advancement of technology, automobile manufacturers are integrating ever more advanced audio/video, navigation, and phone functions on a center console of automobile. However, building so many conventional buttons or knobs on the narrow center console within a vehicle for controlling these functions results in the console that looks too crowded. Therefore, many automobile manufacturers have introduced touch screen technologies to control these complex functions, in order to achieve a simple and elegant design for the center console. Currently, automobile manufacturers have mainly used the thin film transistor-liquid crystal display (TFT-LCD) to design the center console of a car. Since both the TFT-LCD and semiconductor manufacturing require vacuum evaporation and photolithography, the substrate materials that are typically chosen are glass materials which can withstand high temperature as well as etching by strong acids. Moreover, the glass material must have a smooth surface to satisfy a uniformity requirement for evaporation, which largely restricts the design possibilities. Although newer organic light emitting diode (OLED) display technologies may be characterized by flexibility, wide viewing angle, and good color saturation, many technical issues are still waiting to be solved. These deficiencies include inadequate mass production techniques, a shorter life span than the LCD, and immaturity in large size applications.

A curved display that is highly applicable, large size, and with a long life span cannot be effectively achieved with the currently mainstream LCD or OLED display techniques. Therefore, automobile manufacturers are limited to a planar panel design when designing the exterior of the screen display inside a car cabin, as well as being limited to a dull display interface design. Due to the monotonous nature of the displays, automobile manufacturers often choose not to employ these displays at a large size as a design element.

Accordingly, a projection system that can be applied in the audio/video system of the car not only adds variety, but can also effectively and practically reduce costs. Moreover, while the vehicle is being driven, the driver and the other passengers often want to view different images. Therefore, how to design a projection system which can satisfy both the driver and the other passengers is also an issue of primary importance. For example, Taiwan Patent Application No. 201009473 and U.S. Pat. No. 7,777,960, both disclosed techniques for vehicular projection systems.

SUMMARY

The invention provides a projection system capable of satisfying the needs of different viewers.

Other objects and advantages of the invention can be further illustrated by the technical features broadly embodied and described as follows.

In order to achieve one or a portion of or all of the objects or other objects, one embodiment of the invention is directed to a vehicular projection system including a projection apparatus, a beam splitting module, and two projection screens. The projection apparatus provides at least one image light beam. The beam splitting module divides the at least one image beam into a first partial light beam and a second partial light beam. The two projection screens respectively receive the first image light beam from the first partial image light beam and the second image light beam from the second partial image light beam. Each of the first and second image light beams respectively forms an image on one of the two projection screens corresponding thereto.

Another embodiment of the invention provides a projection system including a projection apparatus, a beam splitting module, and two projection screens. The projection apparatus provides an image light beam. The beam splitting module divides the image light beam into a first image light beam and a second image light beam. The two projection screens respectively receive the first and second image light beams. Each of the first and second image light beams respectively forms an image on one of the two projection screens corresponding thereto.

Another embodiment of the invention provides a projection system including a projection apparatus, a beam splitting module, and a plurality of projection screens. The projection apparatus provides a plurality of image light beams, in which each of the image beams respectively has different image information. The beam splitting module divides the image light beams according to the different image information. Each of the projection screens respectively receives the image light beams corresponding thereto for forming an image on the projection screens.

In summary, the embodiments of the invention can achieve at least the following effects and advantages. According to the embodiments of the invention, by utilizing the electronic signals of a projection apparatus with the mechanical beam splitting module, the projection system can respectively project signals belonging to two images on different screens, thereby satisfying the needs of different viewers.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
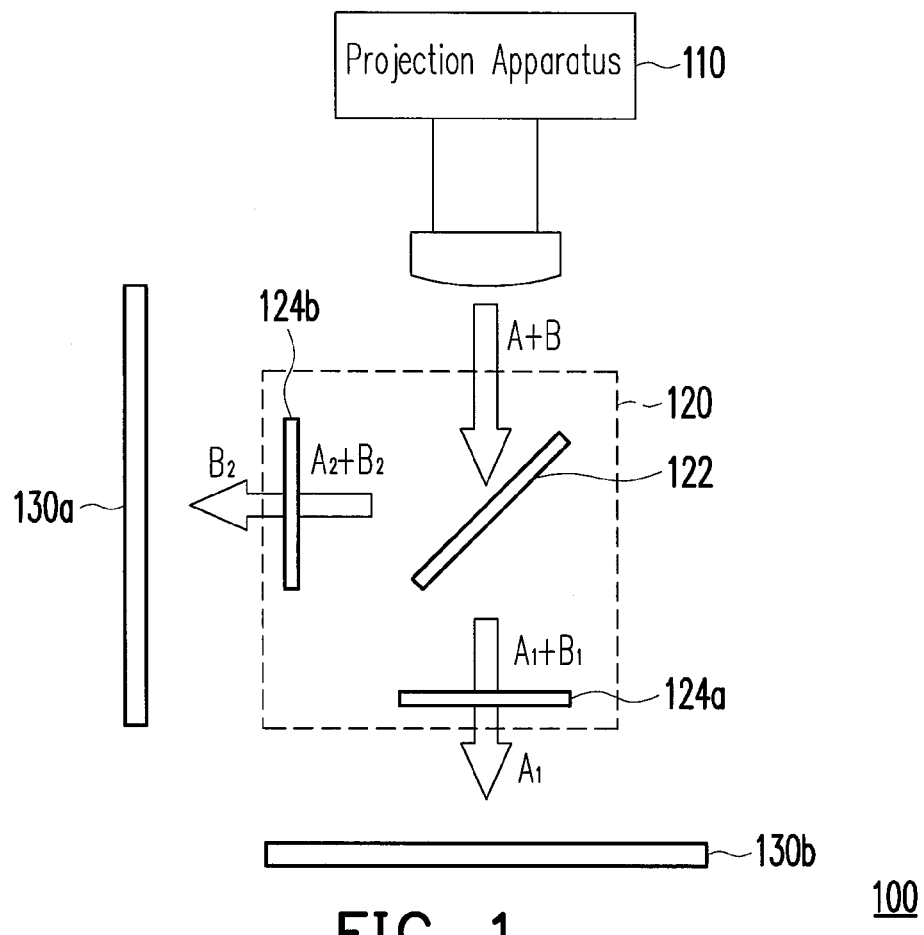
FIG. 1 is a schematic view illustrating a projection system according to a first embodiment of the invention.

FIG. 1 is a schematic view illustrating a projection system according to a first embodiment of the invention. Referring to FIG. 1, in the embodiment, a projection system 100 includes a projection apparatus 110, a beam splitting module 120, and two projection screens 130a and 130b. The projection apparatus 110 provides image light beam A+B. The beam splitting module 120 divides the image light beam A+B into a first image light beam $A_1$ and a second image light beam $B_2$. The two projection screens 130b and 130a respectively receives the first image light beam $A_1$ and the second image light beam $B_2$. Each of the first and second image light beams $A_1$ and $B_2$ respectively forms an image on one of the two projection screens 130b and 130a corresponding thereto. In the embodiment, the first image light beam $A_1$ forms an image on the projection screen 130b that a driver wants to view, such as a navigation image, for example; the second image light beam $B_2$ forms an image on the projection screen 130a that the other passengers want to view, such as a movie image, for example, so as to satisfy the needs of different viewers.

Therefore, in order to accomplish at least the above objectives, the first image light beam $A_1$ has a first image information, the second image light beam $B_2$ has a second image information, and the two image information are different image information that different viewers want to watch, such as vehicle information, road condition information, and multimedia images such as entertainment programs.

The beam splitting module 120 includes a beam splitter 122, a first optical shutter 124a, and a second optical shutter 124b, in which the optical shutters may be liquid crystal (LC) panels or mechanical light grating devices. The beam splitting module 120 is for allowing one half of a light quantity of a light image beam A+B to pass through and the other half of the light quantity to reflect. Therefore, the beam splitting module 120 can divide the image light beam A+B into a first partial image light beam $A_1+B_1$ and a second partial image light beam $A_2+B_2$. Moreover, compared to the image light beam A+B before the light beam split, the first partial image light beam $A_1+B_1$ and the second partial image light beam $A_2+B_2$ retain approximately 50% of the original brightness of the image light beam A+B, for example, although the invention is not limited thereto. For the first partial image light beam $A_1+B_1$, when the first optical shutter 124a is opened, the first image light beam $A_1$ in the first partial image light beam $A_1+B_1$ can pass through the first optical shutter 124a and project onto the projection screen 130b to form a first image. For the second partial image light beam $A_2+B_2$, when the second optical shutter 124b is opened, the second image light beam $B_2$ in the second partial image light beam $A_2+B_2$ can pass through the second optical shutter 124b and project onto the projection screen 130a to form a second image.

Figure 2:
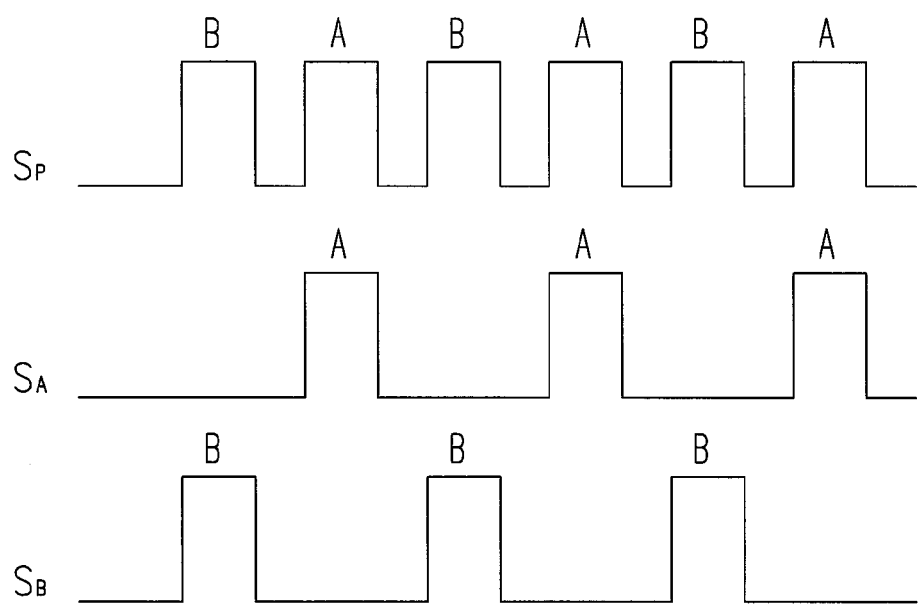
FIG. 2 is a waveform diagram of the electronic signals controlling the projection apparatus and the first and second optical shutters according to the first embodiment of the invention.

FIG. 2 is a waveform diagram of the electronic signals controlling the projection apparatus and the first and second optical shutters according to the first embodiment of the invention. Referring to FIGS. 1 and 2, in the embodiment, in order to accomplish at least the objective of projecting different images on different screens, the first image light beam $A_1$ and the second image light beam $B_2$ having the first image information and the second image information are alternately projected from the projection apparatus 110. Moreover, the first optical shutter 124a opens or closes according to a frequency which the first image information is being projected from the projection apparatus 110; the second optical shutter 124b opens or closes according to a frequency which the second image information is being projected from the projection apparatus 110. However, the optical shutters are not limited to being opened or closed according to the frequency of the projection of the image information.

Specifically, as shown in FIG. 2, a control signal Sp is an electronic signal controlling the projection apparatus 110 to project the image information. The reference symbols A and B labeled on the high level of the control signal $S_P$ respectively represents the image light beam A+B projected from the projection apparatus 110 which is controlled by the control signal $S_P$ in a timing sequence, and includes the first image information corresponding to the first image light beam $A_1$, or includes the second image information corresponding to the second image light beam $B_2$.

The control signals $S_A$ and $S_B$ are electronic signals respectively controlling the opening or closing of the first and second optical shutters 124a and 124b. When the first partial image light beam $A_1+B_1$ is transmitted to the first optical shutter 124a, the first optical shutter 124a is controlled by the control signal $S_A$ at the high level to open, so the first image light beam $A_1$ passes through the first optical shutter 124a and is projected onto the projection screen 130b. Similarly, when the second partial image light beam $A_2+B_2$ is transmitted to the second optical shutter 124b, the second optical shutter 124b is controlled by the control signal $S_B$ at the high level to open, so the second image light beam $B_2$ passes through the second optical shutter 124b and is projected onto the projection screen 130a. The reference symbols A and B labeled on the high level of the control signals $S_A$ and $S_B$ represent the first or second optical shutters 124a or 124b being opened in a timing sequence.

Therefore, the embodiment uses the electronic signals of the projection apparatus 110 and the switching of the first and second optical shutters 124a and 124b to achieve an effect of multi-images on one device. The projection apparatus 110 projects the first and second image information of the image light beam A+B in an alternating timing sequence. The beam splitting module 120 is then used to divide the image light beam A+B into two, and when the first and second partial image light beams $A_1+B_1$ and $A_2+B_2$ respectively passes through the first and second optical shutters 124a and 124b, the two partial image light beams $A_1+B_1$ and $A_2+B_2$ are filtered to remain first and second image light beams $A_1$ and $B_2$ as required by the projection screens 130b and 130a, so as to satisfy the needs of the different viewers.

On the other hand, in the embodiment, the image light beam A+B may also respectively have different polarizations. For example, the light beam A of the image light beam A+B is p-polarized and includes the first image information, and the image light beam B of the image light beam A+B is s-polarized and includes the second image information. The first and second optical shutters 124a and 124b may be respectively exchanged with a first polarizer and a second polarizer (not drawn). The first polarizer allows the first image light beam $A_1$ to pass through and project onto the projection screen 130b. The second polarizer allows the second image light beam $B_2$ to pass through and project onto the projection screen 130a.

Second Embodiment

Figure 3:
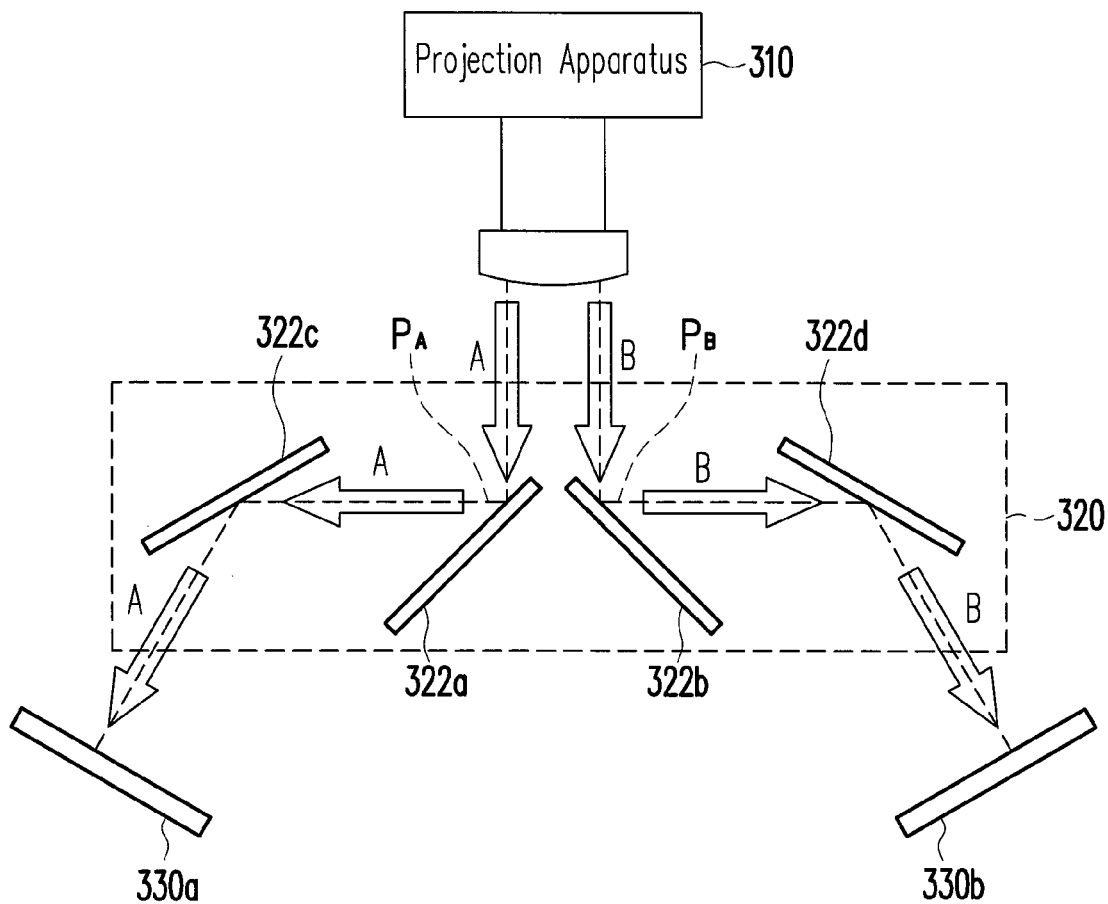
FIG. 3 is a schematic view illustrating a projection system according to a second embodiment of the invention.

FIG. 3 is a schematic view illustrating a projection system according to a second embodiment of the invention. A projection system 300 of the embodiment includes a projection apparatus 310, a beam splitting module 320, and two projection screens 330a and 330b. The projection apparatus 310 provides a plurality of image light beams, including the first and second image light beams A and B, for example, each respectively corresponding to the first and second image information. It should be noted that, in the embodiment, in order to accomplish at least the objective of projecting different images on different screens simultaneously, the first and second image light beams A and B are simultaneously projected from the projection apparatus 310, so as to satisfy the needs of different viewers.

Figure 4:
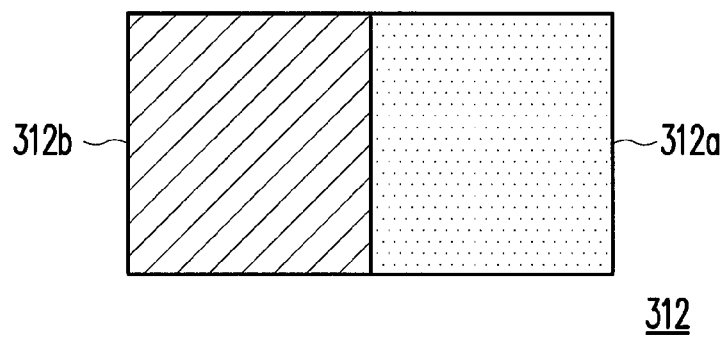
FIG. 4 is a schematic view illustrating a light valve of a projection apparatus according to the second embodiment of the invention.

Specifically, FIG. 4 is a schematic view illustrating a light valve of a projection apparatus according to the second embodiment of the invention. Referring to FIGS. 3 and 4, the projection apparatus 310 of the embodiment includes a light valve 312 internally. As shown in FIG. 4, a right half portion 312a of the light valve 312 has an image corresponding to a first image information, and a left half portion 312b of the light valve 312 has an image corresponding to a second image information. Therefore, the first and second image light beams A and B projected from the projection apparatus 310 through the light valve 312 respectively correspond to the first and second image information. For example, the first image light beam A is generated by the right half portion 312a of the light valve 312; on the other hand, the second image light beam B is generated by the left half portion 312b of the light valve 312. In the embodiment, the images on the light valve 312 respectively corresponding to the first and second image light beams A and B are not overlapping. The first image information and the second image information are, for example, image information that different viewers want to watch, such as vehicle information, road condition information, and multimedia images such as entertainment programs.

After the projection apparatus 310 projects the first and second image light beams A and B, the beam splitting module 320 divides the first and second image light beams A and B into two paths, and projects the first and second image light beams A and B on the two projection screens 330a and 330b. In the embodiment, the beam splitting module 320 includes a plurality of reflection elements 322a, 322b, 322c, and 322d. The reflection elements are each a reflection mirror, for example, for reflecting the first or second image light beams A or B.

In the embodiment, the beam splitting module 320 includes the projection paths $P_A$ and $P_B$. Using the first image light beam A as an example, the first image light beam A is transmitted on the projection path $P_A$ of the beam splitting module 320, and after being reflected once by each of the reflection elements 322a and 322c, the first image light beam A is projected onto the projection screen 330a. In other words, the first image light beam A is projected onto one of the two projection screens through at least one reflection. Similarly, the second image light beam B is transmitted on the projection path $P_B$ of the beam splitting module 320, and after being reflected once by each of the reflection elements 322b and 322d, the second image light beam B is projected on the projection screen 330b. In other words, the second image light beam B is projected on the other one of the two projection screens through at least one reflection.

Figure 5:
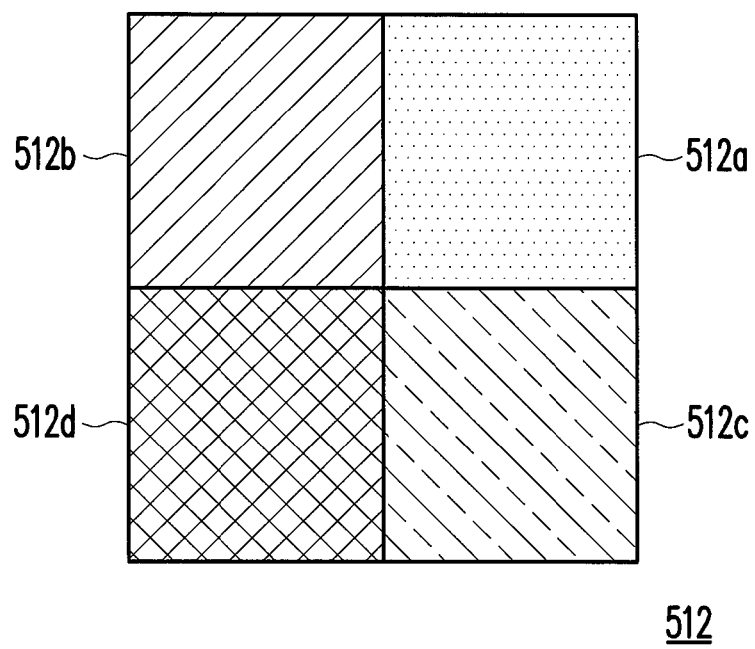
FIG. 5 is a schematic view illustrating a light valve of a projection apparatus according to another embodiment of the invention.

In the embodiment, the light valve 312 is divided into two portions, including the right half portion 312a and the left half portion 312b. In other embodiments, the light valve may also be divided into a plurality of portions, so as to achieve the effect of multi-images on one device. FIG. 5 is a schematic view illustrating a light valve of a projection apparatus according to another embodiment of the invention. Referring to FIG. 5, a light valve 512 of the embodiment is divided into four portions, including a upper right portion 512a, a upper left portion 512b, a bottom right portion 512c, and a bottom left portion 512d respectively corresponding to different image information. In a display method using this light valve, the beam splitting module 320 may include a plurality of projection paths, for example, so as to respectively project the corresponding portion of the image light beam onto different projection screens. In other words, the invention places no limits on the number of the divided portions of the light valve, the number of image light beams generated, and the number of projection screens in the embodiment.

Therefore, by using light valves which include different images, the projection apparatus 310 can achieve the effect of multi-images on one device. The projection apparatus 310 simultaneously projects the first image light beam A including the first image information, and the second image light beam B including the second image information to the beam splitting module 320. Thereafter, the beam splitting module 320 is used so the first and second image light beams A and B are respectively transmitted on different reflection paths.

Accordingly, the required images are projected on the projection screens 330a and 330b, so as to satisfy the needs of different viewers.

In view of the foregoing, the embodiments of the invention can achieve at least the following effects and advantages. According to the embodiments of the invention, by utilizing the electronic signals in the projection apparatus having different image information, or using the light valves in the projection apparatus having divided images, and combined with a mechanical beam splitting module, the projection system can respectively project two different images on different screens, thereby satisfying the needs of different viewers.

Figure 6:
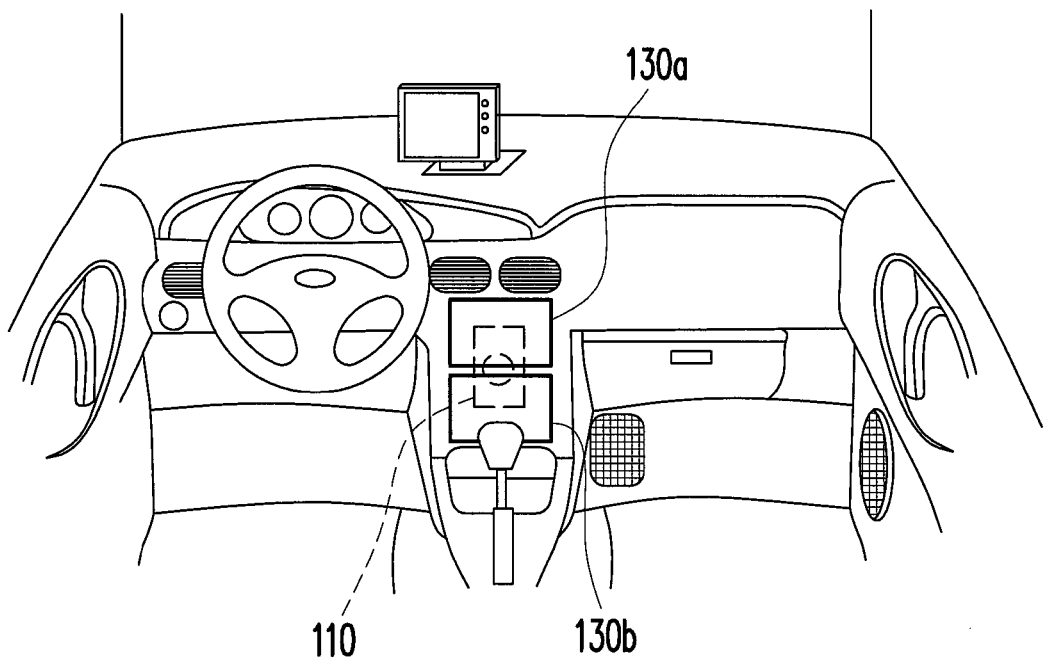
FIG. 6 is a schematic view illustrating a projection system applied in a car cabin according to an embodiment of the invention.

FIG. 6 is a schematic view illustrating a projection system applied in a car cabin according to an embodiment of the invention. Referring to FIGS. 1 and 6, the projection system 100 may be applied inside the car cabin, for example, to implement the effect of multi-images on one device. In the embodiment, the first image light beam $A_1$ forms an image on the projection screen 130a that a driver wants to view; the second image light beam $B_2$ forms an image on the projection screen 130b that the other passengers want to view, so as to satisfy the needs of different viewers.

On the other hand, the projection system 300 of the second embodiment may also be applied inside the car cabin (not drawn), and in this case the first and second image light beams A and B depicted in FIG. 3 are respectively transmitted on different reflection paths to project the required images on the projection screens 330a and 330b.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A vehicular projection system, which is non-stereoscopic, comprising:
a projection apparatus providing at least one image light beam;
a beam splitting module dividing the at least one image light beam into a first partial image light beam and a second partial image light beam, wherein the at least one image light beam comprises a first image information and a second image information simultaneously; and
two projection screens, which do not overlap one another, respectively receiving a first image light beam from the first partial image light beam and a second image light beam from the second partial image light beam, wherein the first and second image light beams correspond to the first and second image information respectively, the first and second image light beams respectively have different polarizations, the beam splitting module comprises a first polarizer and a second polarizer, the first polarizer allows the first image light beam to pass through and project onto one of the two projection screens, the second polarizer allows the second image light beam to pass through and project onto the other one of the two projection screens, and each of the first and second image light beams respectively forms an image on one of the two projection screens corresponding thereto.

2. The vehicular projection system as claimed in claim 1, wherein the projection system is disposed inside a center console of a vehicle.

3. The vehicular projection system as claimed in claim 2, wherein the projection screens correspond to a shape of a surface of the center console to form a curved surface.

4. The vehicular projection system as claimed in claim 1, wherein the first and second image light beams corresponding to the first and second image information are projected alternately on the projection screens from the projection apparatus.

5. The vehicular projection system as claimed in claim 1, wherein the beam splitting module comprises a beam splitter dividing the at least one image light beam into the first image light beam and the second image light beam.

6. The vehicular projection system as claimed in claim 1, wherein the projection apparatus comprises a light valve, the light valve includes one region having the first image information and another region having the second image information, and the first image light beam and the second image light beam generated by the regions correspond to the first image information and the second image information respectively.

7. The vehicular projection system as claimed in claim 6, wherein the first and second image light beams corresponding to the first and second image information are simultaneously projected onto the projection screens from the projection apparatus.

8. The vehicular projection system as claimed in claim 6, wherein the images respectively corresponding to the first and second image light beams corresponding to the first and second image information are not overlapping.

9. A projection system, which is non-stereoscopic, adapted for using in a vehicle, the projection system comprising:
a projection apparatus providing an image light beam;
a beam splitting module dividing the image light beam into a first image light beam and a second image light beam, wherein the image light beam comprises a first image information and a second image information simultaneously, and the first and second image light beams respectively correspond to the first and second image information; and two projection screens, which do not overlap one another, respectively receiving the first and second image light beams, wherein the first and second image light beams respectively have different polarizations, the beam splitting module comprises a first polarizer and a second polarizer, the first polarizer allows the first image light beam to pass through and project onto one of the two projection screens, the second polarizer allows the second image light beam to pass through and project onto the other one of the two projection screens, and each of the first and second image light beams respectively forms an image on one of the two projection screens corresponding thereto.

10. The projection system as claimed in claim 9, wherein the beam splitting module comprises a beam splitter dividing the image light beam into the first image light beam and the second image light beam.

* * * * *